United States Patent [19]

Mercer

[11] 4,394,342
[45] Jul. 19, 1983

[54] FORMING PLASTIC ARTICLES HAVING STRANDS BY STRETCHING

[75] Inventor: Frank B. Mercer, Blackburn, England

[73] Assignee: P.L.G. Research Limited, Blackburn, England

[21] Appl. No.: 193,729

[22] Filed: Oct. 3, 1980

[30] Foreign Application Priority Data

Oct. 9, 1979 [GB] United Kingdom ............... 7935034
Jul. 8, 1980 [GB] United Kingdom ............... 8022318

[51] Int. Cl.³ ............................................. B29C 17/03
[52] U.S. Cl. ......................... 264/292; 264/DIG. 81; 425/383; 425/DIG. 48; 425/DIG. 53
[58] Field of Search ............... 264/292, 291, DIG. 47, 264/DIG. 70, DIG. 81; 425/383, 394, 445, DIG. 48, DIG. 53, DIG. 236

[56] References Cited

U.S. PATENT DOCUMENTS

| | | | |
|---|---|---|---|
| 3,140,330 | 7/1964 | Gutierrez | 264/288.8 |
| 3,256,564 | 6/1966 | Welshon | 264/292 |
| 3,261,903 | 7/1966 | Carr | 264/235.8 |
| 3,365,352 | 1/1968 | Van Burleigh et al. | 264/291 |
| 3,386,876 | 6/1968 | Wyckoff | 264/290.2 |
| 3,608,032 | 9/1971 | Boultinghouse | 264/291 |
| 3,642,967 | 2/1972 | Doll | 264/51 |
| 3,682,760 | 8/1972 | Fairbanks | 264/291 |
| 3,756,300 | 9/1973 | Nalle, Jr. | 264/292 |
| 4,197,075 | 4/1980 | Suzuki | 425/DIG. 53 |
| 4,276,255 | 6/1981 | Russell | 264/291 |

FOREIGN PATENT DOCUMENTS

| | | |
|---|---|---|
| 1921918 | 11/1970 | Fed. Rep. of Germany . |
| 2504440 | 12/1976 | Fed. Rep. of Germany ...... 264/522 |
| 2131841 | 11/1972 | France . |
| 569340 | 5/1945 | United Kingdom ................. 264/322 |
| 607995 | 9/1948 | United Kingdom . |
| 1027691 | 4/1966 | United Kingdom . |
| 1138391 | 1/1969 | United Kingdom . |
| 1223027 | 2/1971 | United Kingdom . |
| 2035191A | 6/1980 | United Kingdom . |

Primary Examiner—James B. Lowe
Attorney, Agent, or Firm—Holman & Stern

[57] ABSTRACT

In order to make a non-planar plastics material article, a starting material has at least one ring of holes or depressions and is pressed so that the part which is within the ring is moved generally at right angles to the plane of the ring with respect to the part which is outside the ring, thereby stretching, into orientated strands, zones between adjacent holes or depressions in the ring; in the finished article, the strands interconnect the two parts.

13 Claims, 22 Drawing Figures

FORMING PLASTIC ARTICLES HAVING STRANDS BY STRETCHING

BACKGROUND OF THE INVENTION

The invention relates to plastic material articles having openings therein, which may or may not be closed by film, and to a method of making the articles.

There have been various proposals for making such articles by hot forming or moulding of mesh structures. For instance articles such as brassiere cups and fruit bowls have been made in this manner. British Patent Specification No. 1,027,691 and U.S. Pat. No. 3,642,967 describe methods of this general type. The articles so formed are relatively heavy and/or relatively weak, being formed primarily of unorientated plastic material.

As a technique, vacuum forming is well known, and usually a flat piece of imperforate plastic sheet or film is drawn at an elevated temperature by vacuum into a non-planar shape. British Patent Specification No. 607,995 describes a technique of this type. The articles so formed are relatively weak, being formed primarily of unorientated plastic material.

British Patent Specification No. 2,035,191 A describes a new technique for making flat mesh structures by stretching a starting material which has a pattern of holes or depressions therein, forming strong structures with a high degree of orientation. This Specification however does not disclose non-planar articles.

SUMMARY OF THE INVENTION

This invention affords a method of making a plastic material article comprising providing a piece of plastic starting material having therein at least one ring of holes or depressions; and moving a part of the piece which is within the ring with respect to a part which is outside the ring, generally at right angles to a notional plane which generally intersects the holes or depressions of the ring, thereby stretching, into oriented strands, zones between adjacent holes or depressions in the ring, which strands interconnect the two parts. This invention also affords a plastic article, comprising a first part and a substantially unoriented second part having an inner margin generally in the form of a ring, the first part being considerably out of the plane of the second part and being connected to the inner margin of the second part by means comprising spaced side-by-side strands which are oriented in the direction of their lengths.

It will be understood that if the ring of holes or depressions is around the sides of a non-planar piece of starting material, the notional plane need not intersect all the holes or depressions of the ring; the notional plane is only referred to indicate the direction of movement of the part within the ring of holes or depressions. It will also be understood that only the inner margin of the second part of the article need be in the form of a ring, for the second part may be much larger.

The articles of the invention can be, for instance, tote (i.e. carrying) baskets in general, baskets for small agricultural or horticultural produce, shopping or supermarket baskets, fish baskets, freezer or supermarket containers, snack containers, gift baskets, lobsters pots, bottle crates, moulded furniture and lampshades. If the starting material is formed with depressions and the plastics materials in the depressions does not rupture during stretching but forms orientated film, the articles could be buckets, washing bowls, tubs, plant containers, drinks containers, and also generally as above, for instance moulded furniture, lampshades and food containers.

The invention can give the following advantages:
(i) Reduction in product weight as a result of molecular orientation.
(ii) Improved physical strength as a result of molecular orientation.
(iii) Very good physical properties, since the forming process can take place at the optimum orientation temperature.
(iv) More suitable resins, i.e. tougher resins with higher density and lower melt flow index, can be used since complex mould channels are not required.
(v) Elimination of high capital outlay for injection moulding machine having large daylight (i.e., large spacing between platens when disengaged).
(vi) Elimination of high cost injection moulds.
(vii) Quicker return on capital outlay.
(viii) Elimination of high mould maintenance cost (normally higher for open mesh products).
(ix) Elimination of flashing and subsequent deflashing operation.
(x) Low cost sampling as a result of an ability to prepare preforms (i.e. starting material) by drilling or machining.
(xi) Prepared preforms can be transported to major market areas for forming, thus reducing transport costs.
(xii) Export of preforms in high bulk density for subsequent local forming.

If the starting material has been injection moulded:
(xiii) Low mould costs.
(xiv) As a result of preform simplicity, lower melt flow index resins can be used.
(xv) Preform mouldings can be automatically ejected (difficult or impossible with three dimensional mesh products).

The holes or depressions in the starting material, and any other shaping of the starting material, can be produced, for instance, by embossing, punching or stamping, drilling or injection moulding. It will be noted that the part of the starting material which corresponds to the outer part of the article and the part which corresponds to the inner part of the article, need not be planar.

The zone or zones in which the holes or depressions are formed is preferably planar, and if there are depressions, including a membrane, the membrane preferably lies on the median plane of the zone. However, for some articles, there are advantages in having a starting material which is distinctively non-planar, for instance itself being injection moulded. In this way, the use of the invention provides the advantages of increased strength and saving of material and also reduces the size of the dies required for forming the starting material. In general, however, those parts which are stretched preferably have parallel faces.

The part which is within the ring of holes or depressions may simply be moved in one direction generally at right angles to said notional plane of the ring. Alternatively, the starting material can be stretched by parts thereof being moved in two opposite directions, preferably sequentially, with respect to the part which is outside the ring(s).

The starting material can be any suitable thermoplastic material, for instance, high density polyethylene (HDPE) or polypropylene. The starting material can be of any suitable thickness, the preferred range being 0.2 millimeters up to 12 millimeters through a preferred minimum is 1 millimeter and a preferred maximum is 4.5 or 5 millimeters.

The stretching is carried out at a temperature above the second order transition temperature of the plastics material but substantially below the softening point so that significant melt flow orientation is avoided during the stretching. For example, for HDPE, the preferred temperature range is 95°–102° C. and for polypropylene, the preferred temperature range is 96°–104° C.

BRIEF DESCRIPTION OF THE DRAWINGS

The invention will be further described, by way of example, with reference to the accompanying drawings, in which.

DESCRIPTION OF THE PREFERRED EMBODIMENTS

Figure 1:
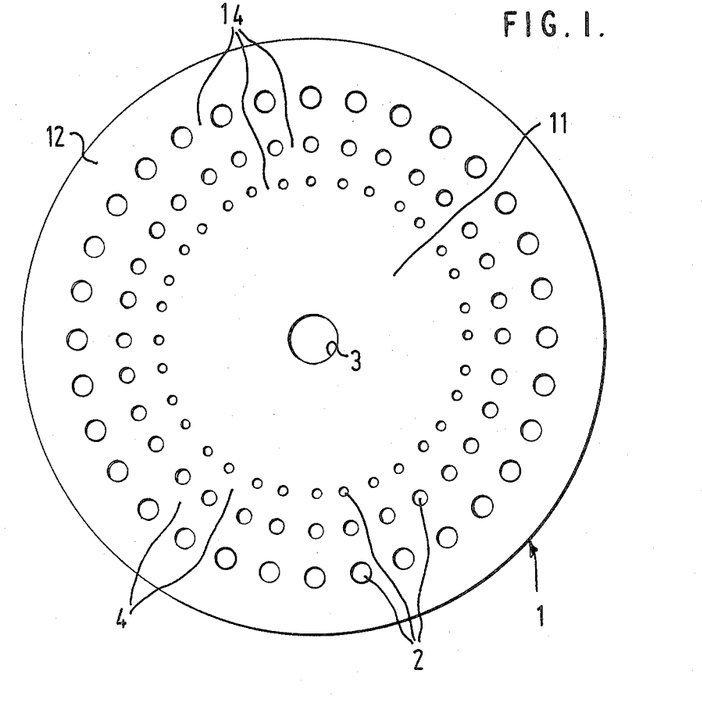
FIGS. 1, 2 and 3 show a piece of starting material, a tool and a finished non-planar article, respectively, in accordance with one method of the invention.

FIG. 1 shows a planar parallel-faced starting material 1, which in this case is a flat disc of plastic material having therein a plurality of coaxial circular rings of holes or depressions 2 and a central hole 3. The holes or depressions 2 of any one ring are on the same (notional) radial lines as the corresponding holes or depressions 2 of the other rings, and annular zones 4 are left between the rings or holes or depressions 2. The sides of the holes or depressions 2 are equal distances apart in the circumferential direction, in all the rings. Thus, in any one ring, the sum of the cross-sectional areas of each zone 14 between adjacent holes or depressions 2 of the ring, as measured in the cross-sectional plane of each such zone which has the smallest area, is equal to that in the other rings.

Figure 2:
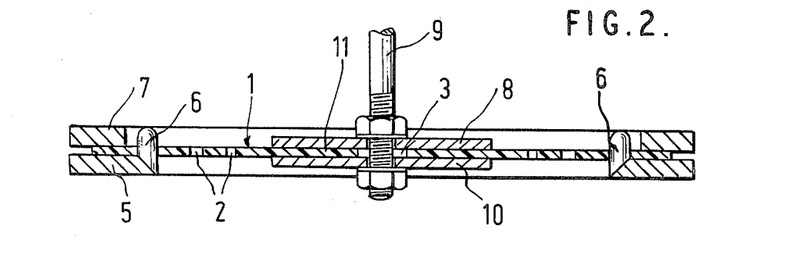

The starting material 1 is put in the tool illustrated in section in FIG. 2. Only part of the tool is illustrated, but it has a fixed retaining surface or retainer plate 5 mounting a plurality of pins 6 which engage in the holes or depressions 2 of the outer ring, a clamping plate 7 which clamps the starting material 1 against the retainer plate 5, a movable presser plate 8 which engages the centre part of the starting material 1 and an actuating rod 9. The central hole 3 is entered by a projection on the presser plate 8 and ensures that the starting material 1 does not move sideways during pressing. In general, the presser plate 8 could merely abut the centre part of the starting material 1 or could be of greater diameter and have pins, similar to the pins 6, for engaging in the holes or depressions 2 of the inner ring, in which cases the starting material 1 need not have a central hole 3. If desired (as shown), a clamping disc 10 can be provided for clamping the centre part of the starting material 1 against the presser plate 8. The plates 5, 7 and 8 and the disc 10 are circular and concentric with the rings of holes or depressions 2.

Figure 3:
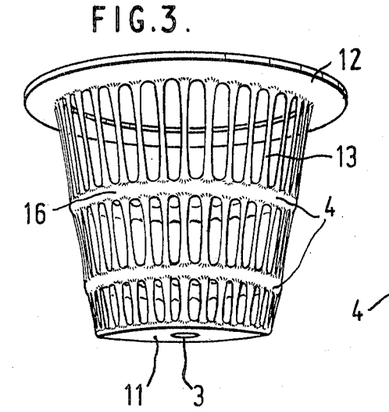

The starting material 1 is heated to a suitable temperature. The actuating rod 9 is moved downwards, i.e. at right angles to the plane of the rings of holes or depressions 2 (and to a notional plane which intersects the centres of any of the rings of holes or depressions 2), moving the central (first) part 11 of the starting material 1 with respect to the outer (second) part 12. This movement stretches, into spaced, side-by-side orientated strands 13, the zones 14 between adjacent holes or depressions 2 in the original ring; the strands 13 are orientated in the direction of their length and in effect connect (or more generally afford means connecting) the inner part 11 to the inner margin of the outer part 12 in the finished, non-planar article. The inner margin of the outer part 12, and indeed the whole of the outer part 12, is in the form of a ring and in a general sense, surrounds the inner part 11, though it is considerably out of the plane of the inner part 11. The annular zones 4 twist round so that their faces are roughly aligned with the strands 13 on either side, the zones 4 forming hoops around the article. It will be seen that the strands 13 on one side of each zone 4 are aligned with those on the other side. It will also be seen that the strands 13 are in well-defined rings around the article, separated by the hoop zones 4, the strands 13 of one ring being distinct from the strands 13 of the adjacent ring. The outer part 12, which forms an uninterrupted zone around the plastics material which has been stretched and orientated, is not itself substantially stretched during the pressing, the outer strands 13 being connected directly to its inner margin. The inner part 11 has likewise not been substantially stretched or orientated, in this particular case.

Figure 4:
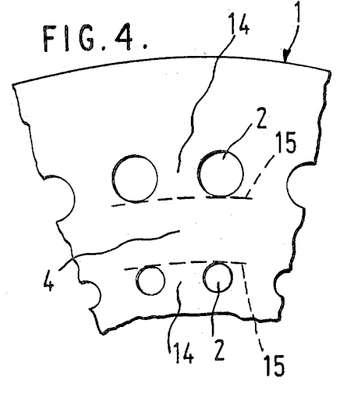
FIGS. 4 and 5 show a small portion of the starting material and article of FIGS. 1 and 3, respectively, to explain what occurs during forming.
Figure 5:
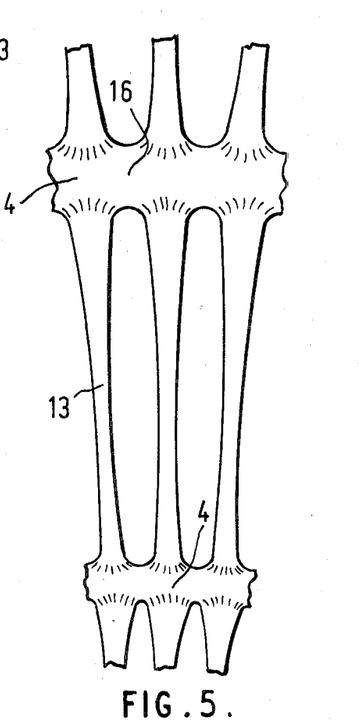
Figure 6:
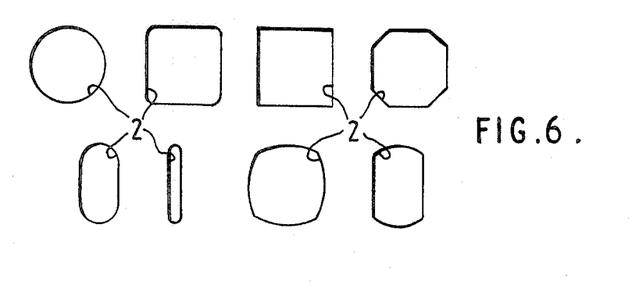
FIG. 6 shows various shapes for the holes or depressions in the starting material.

A detailed explanation of what occurs when stretching the zones 14 to form the strands 13, is given in British Patent Specification No. 2 035 191 A and FIGS. 4 and 5 of the present application correspond generally to FIGS. 1 and 2 of the Patent Specification whilst FIG. 6 of the present application is the same as FIG. 10 of the Patent Specification.

However, in simple terms, the stretching will begin at the narrowest point of the zones 14, and as stretching continues, the orientation will pass along the zones 14 and will then pass into the zones 4, passing beyond the notional tangent lines 15 (tangential to the holes or depressions 2); in this way, some of the material which was originally in the zones 4 is drawn out and forms the end parts of the strands 13. Pressing is preferably terminated when the orientation of the strands 13 has not passed right through the zones 4, and it will be seen that in any case, the zones 16 which, in the original material, were between adjacent holes or depressions 2 of different rings, are not substantially stretched during the pressing. The centre line of each zone 4 will thus preferably retain the thickness of the original starting material 1 while the edges of the hoops formed from the zones 4 will be of undulating section. It is believed that by having the sides of the holes or depressions 2 equal distances apart, all the strands 13 have approximately the same width (circumferential direction dimension) and are stretched to substantially the same stretch ratio. The symmetrical disposition of the holes or depressions 2 and of the parts of the tool ensures that all the strands 13 in any one band are stretched to substantially the same stretch ratio, for example 7:1 on the strands (measured by measuring the distance moved by the respective ends of the holes or depressions on either side of the strand).

In the finished article, the extra thickness of the hoop-like zones provide good compression strength whilst the orientation of the strands 13 provides good tensile strength in the vertical direction.

When the article has been formed, it is preferably allowed to relax at a temperature close to the pressing temperature whilst still held in its stretched position by the tool, thus reducing the possibility of the finished article shrinking and distorting in subsequent use.

The holes or depressions 2 need not be circular. FIG. 6 shows various shapes. The elongated holes or depressions 2 can be elongated in the direction of pressing or normal thereto. Depending somewhat on the shape of the holes or depressions 2, their area in general is preferably less than 50% of the (plan view) area of the starting material 1, and more preferably less than 25% thereof.

The starting material 1 can be printed in selected areas to give decorative effects or convey a message, such areas normally being areas which are not stretched during pressing.

Figure 7:
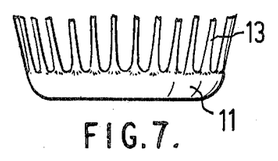
FIGS. 7 and 8 illustrate alternative shapes for part of the article, for instance of FIG. 3.
Figure 8:
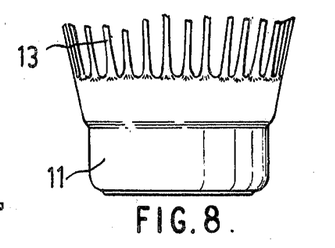

FIGS. 7 and 8 illustrate that the outer zone of the inner part 11 can itself be orientated, though it is preferred in these cases to provide an outer former into which the base of the article is pressed, and to shape the moving part of the tool accordingly.

Figure 9:
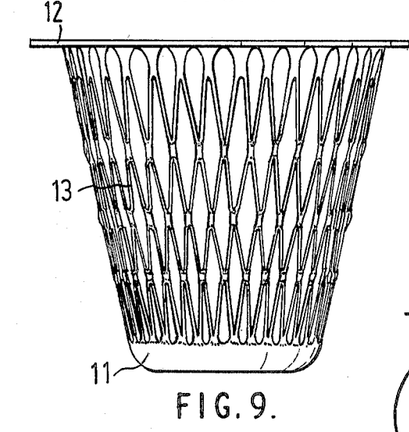
FIG. 9 illustrates another article in accordance with the invention.

Various patterns can be used for the holes or depressions 2. The holes or depressions 2 in the various rings need not be on the same (notional) radial lines, and can for instance be in a "diamond" pattern, with the holes or depressions 2 of one ring staggered with respect to those of the next ring or rings. FIG. 9 illustrates an article made from holes or depressions 2 in a diamond pattern, the rings of orientated strands 13 being distinct from one another and separated by junctions between the strands 13. Furthermore, other patterns can be used (see the description of FIG. 18, below) if desired, and also the starting material may have annular zones of holes or depressions 2 in different patterns in the different zones; the hoop zones 4 can be present, if desired. In general, it is believed desirable that the sum of the distances (as measured in the circumferential direction) between each adjacent pair of holes or depressions in one ring be equal to that in the other ring or rings if the strands are to be stretched out the same ratio in each ring, though this would allow having double as many strands in one ring as in another.

Figure 10:
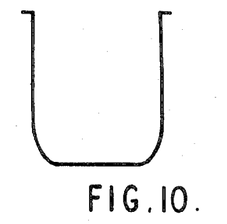
FIGS. 10 to 12 illustrate further possible shapes for articles in accordance with the invention.
Figure 11:
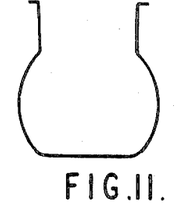
Figure 12:
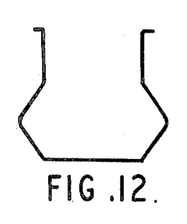
Figure 20:
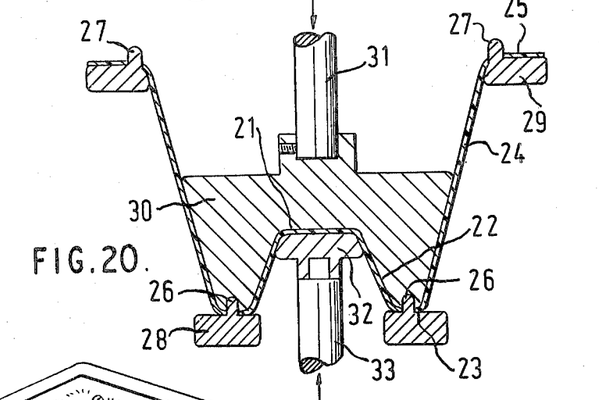
FIG. 20 is a schematic section, illustrating a way of making another article.
Figure 21:
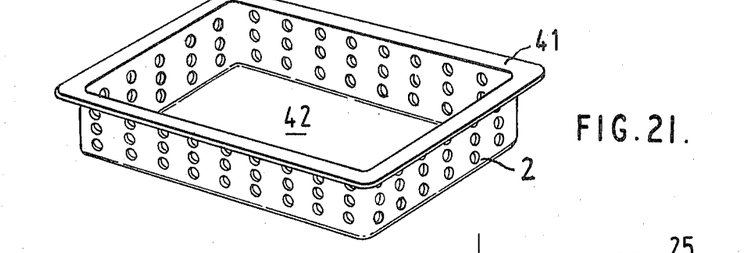
FIG. 21 is an isometric view of further starting material.

The article need not have the truncated wedge shape in cross-section which is seen in FIGS. 3 and 7 to 9. Using an expanding tool, articles having the shapes shown in FIGS. 10 to 12, and other suitable shapes, can be made. FIGS. 20 and 21 (see below) show other ways of producing different shapes.

Figure 13:
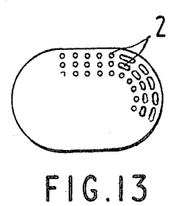
FIGS. 13 and 14 illustrate further possible arrangements of holes or depressions in the starting material.
Figure 14:
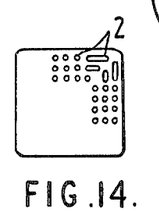

The rings of holes or depressions 2 need not be circular, but they are preferably concentric or coaxial and their centre lines are preferably geometrically similar, the respective parts of the tool being concentric or coaxial and geometrically similar. FIG. 13 illustrates that the rings can be oblong and FIG. 14 illustrates that the rings can be polygonal. The holes or depressions 2 at the ends or corners are elongated so that they remain the same distances apart in the circumferential direction.

Figure 15:
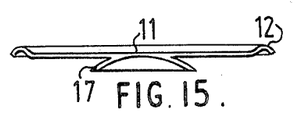
FIGS. 15 and 16 are sections through the starting material and article, respectively, using a different starting material.
Figure 16:
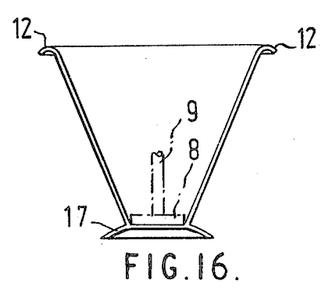

Although the starting material preferably has parallel faces in the zones which are stretched, it may have protruberances which are not substantially deformed during the pressing, e.g. to form a lip or rim on the article, or a foot. FIGS. 15 and 16 show that the outer part 12 has been pre-formed as a lip and the inner part 11 has been provided with a domed foot 17.

Figure 17:
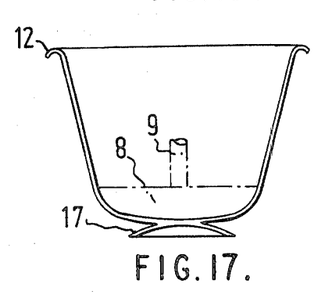
FIG. 17 is a section through an article, using the starting material of FIG. 15 but forming the article in a different way.

FIG. 17 illustrates that if the presser plate 8 is suitably shaped, the shape of the article can be altered, without the necessity for an expanding tool, the article of FIG. 17 being formed from the same starting material as that of FIG. 16.

Figure 18:
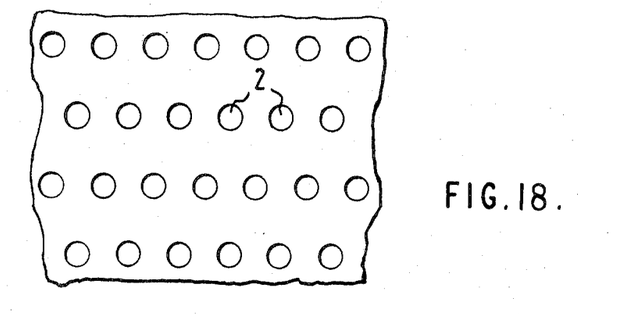
FIG. 18 shows a portion of yet another starting material.

FIG. 18 shows yet another starting material.

Figure 19:
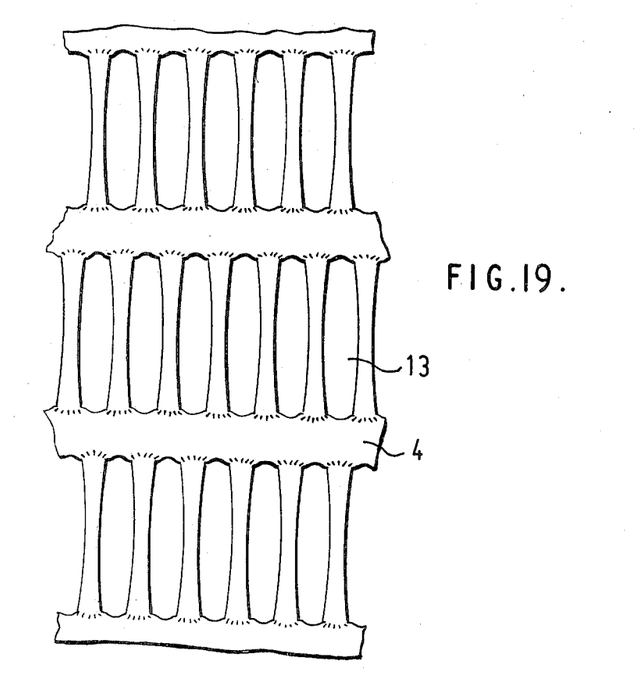
FIG. 19 shows a portion of an article which has been formed from the starting material of FIG. 18.

In FIG. 18, the holes or depressions 2 are shown in straight rows, but these will have the configuration of rings, e.g. generally as shown in any of FIG. 1, 13 or 14. The holes 2 can be formed for instance by punching or by injection moulding. The holes 2 of a given row are aligned with those of one row removed, but are staggered with respect to those of the next row. The holes 2 of one row are preferably halfway between those of the next row. When the starting material is stretched in the N-S direction of the sheet of drawings, orientated strands 13 are formed, as shown in FIG. 19, the strands 13 being likewise staggered. Annular zones 4 are left between the rows or rings of strands 13, and these zones 4 can be as wide as is necessary, e.g. up to 6 mm, to prevent excessive distortion into a serpentine zig-zag shape (the width being considered the N-S dimension in FIG. 19).

FIG. 20 shows an article when it has been stretched. The starting material had a centre zone 21 (which remains unaltered except perhaps at its edges), a first ring or plurality of rings of holes or depressions around the centre zone (which form(s) an inner conical zone 22), a ring-shaped base zone 23 itself having a ring of holes (the base zone 23 remains substantially unaltered, except perhaps at its edges), a second ring or plurality of rings or holes or depressions around the base zone 23 (which form(s) an outer conical zone 24), and a lip or rim zone 25 (which remains substantially unaltered, except perhaps at its inner edge), having a ring of holes near its inner edge. The starting material is placed over rings of pins 26, 27 on two annular tools 28, 29 which are initially positioned with their upper faces coplanar. A tool head 30, mounted on an actuating rod 31, is then moved down to engage the base zone 23 and move it out of its original plane, pushing the tool 28 down at the same time; the tool head 30 stops at a predetermined position. There is a second tool head 32 mounted on an actuating rod 33, which is preferably moved up when the main tool head 30 has reached its bottom position, so as to engage the centre zone 21; however, as alternative possibilities, the second tool head 32 could remain stationary so as to engage the centre zone 21 as the main tool head 30 is still moving down, or the second tool head 32 could be pushed up first, when the bottom face of the main tool head 30 is say level with the top face of the annular tool 29.

The holes or depressions in the zones of the starting material which eventually form the conical zones 22, 24 can be in any suitable pattern, and in the finished article, orientated strands are formed, as described.

Figure 22:
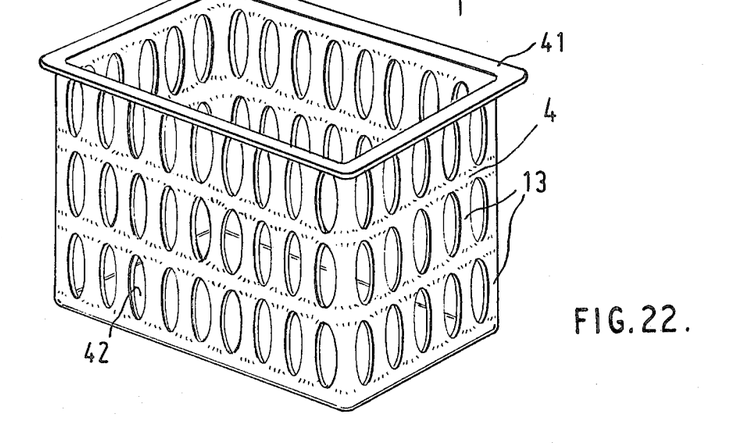
FIG. 22 is an isometric view of an article made from the starting material of FIG. 21.

FIG. 21 shows an injection-moulded starting material, and although the holes 2 can be punched in the injection-moulded material, they are preferably also injection moulded. The starting material has a rim 41 and a base or bottom 42 which can be perforated or unperforated as desired. The holes 2 are formed in the sides, and can be in any suitable pattern, not just as shown in FIG. 21. Although the rim 41 and base or bottom 42 are above and below the rings formed by the holes 2, respectively, they also can be considered as being outside the rings (the rim) and within the rings (the base or bottom). Although the sides are shown as vertical in FIG. 21, they could be inclined. Furthermore the articles could have any other suitable outline, for instance circular. As shown in FIG. 22, in order to form the finished article, the sides are deepened and form orientated strands 13.

EXAMPLE

This Example is in accordance with the method described with reference to FIGS. 1 to 5, except that the starting material 1 had no central hole 3 and a simple flat disc (corresponding to the plate 8) was used for pressing.

The starting material 1 was a 330 mm diameter circular disc of 3 mm thick HDPE, with three concentric rings of punched circular holes at pitch circle diameters of 283, 235.6 and 197 mm, the hole diameters being 12.7, 8.43 and 5 mm respectively; there were 35 holes in each ring. The starting material and product weight was 230 gms. The presser disc diameter was 165 mm. Pressing was effected at 98° C. in a hot water bath, the centre of the starting material disc being moved 235 mm out of its original place in 10 seconds (a wide range of speeds is possible and the speed is not considered critical), and then moved back 10 mm for relaxation, giving an average final stretch ratio on the strands 13 of 7:1. The product and pressing tools were lifted out of the water bath, the product was allowed to cool while held in its stretched position, and the product was released.

The average thickness and width of the mid-points of the strands 13 in all three rings of strands 13 were 1 mm and 5.4 mm respectively. The centre lines of the hoops or zones 4 were 65 and 140 mm respectively vertically above the lower surface of the base or part 11. Each hoop had a width (vertical dimension between openings) of 1.3 mm and the dip were the orientation of the strand penetrated into the hoop extended about 1.5 mm beyond the line tangent to the openings. The product was suitable for use as a waste paper basket.

Corresponding materials, dimensions and procedures can be used to make a product in accordance with FIGS. 21 to 23, and any other Figures of the drawings.

I claim:

1. A method of making a plastic material article, comprising providing a piece of plastic starting material having a plurality of generally coaxial rings of holes or depressions therein, each hole or depression being separated from its adjacent hole or depression in the same ring by a zone, the sum of the cross-sectional areas of all the zones in a given ring being approximately equal to the sum of the cross-sectional areas of each other ring, the cross-sectional area of each zone being the multiplication product of (a) the shortest distance between adjacent holes or depressions and (b) the average thickness of the plastic starting material along that distance, said piece being substantially all at substantially the same temperature, and moving a first part of said piece which is within the rings with respect to a second part which is on the other side of the rings, in a direction generally at right angles to notional planes which generally intersect the holes or depressions of the respective rings, thereby stretching said zones of said given and other rings into oriented strands, said zones in the given ring all being stretched to substantially the same stretch ratio and said zones in the other rings all being stretched to substantially the same stretch ratio.

2. The method of claim 1, wherein there is a plurality of said rings of holes or depressions in the starting piece, the rings being coaxial and the center lines of the rings being geometrically similar, wherein there is an annular zone between two said rings of holes or depressions in the starting piece, said moving being terminated when said annular zone is not substantially stretched.

3. The method of claim 1 wherein those parts of the starting piece which are stretched during said moving have parallel faces.

4. The method of claim 1 wherein the starting piece is stretched by parts thereof being moved in two opposite directions with respect to the second part.

5. The method of claim 1 wherein each generally coaxial ring of holes or depressions has a different perimeter length.

6. The method of claim 1 wherein each generally coaxial ring of holes or depressions has approximately the same perimeter length.

7. A method of making a plastic material article, comprising providing a piece of plastic starting material having a plurality of generally coaxial rings of holes or depressions therein, the sum of the shortest distances between each respective pair of adjacent holes or depressions in a given ring being substantially equal to that in each other ring, and the plastic starting material zones between adjacent holes or depressions of the given ring and other rings being all substantially of the same thickness, said piece being substantially all at substantially the same temperature, and moving a first part of said piece which is within the rings with respect to a second part which is on the other side of the rings, in a direction generally at right angles to notional planes which generally intersect the holes or depressions of the respective rings, thereby stretching said zones of said given and other rings into oriented strands, said zones in the given ring all being stretched to substantially the same stretch ratio and said zones in the other rings all being stretched to substantially the same stretch ratio.

8. The method of claim 1 or 7, wherein there is a plurality of said rings of holes or depressions in the starting piece, the rings being coaxial and the center lines of the rings being geometrically similar, and wherein there is an annular zone between two said rings of holes or depressions in the starting piece, which annular zone twists around so that its faces are roughly aligned with said oriented strands on either side of said annular zone.

9. The method of claim 1 or 7, wherein there is a plurality of said rings of holes or depressions in the starting piece, the rings being coaxial and the center lines of the rings being geometrically similar, wherein there is an annular zone between two said rings of holes or depressions in the starting piece, said moving being terminated when the orientation of the strands passes into, but not right through said annular zone, said annular zone not being otherwise substantially stretched.

10. The method of claim 1 or 7, wherein the starting piece is in a preformed, non-oriented shape having a bottom and sides, said rings of holes or depressions being formed in the sides, the sides being deepened during said moving to form said oriented strands.

11. The method of claim 7 wherein the shortest distance between adjacent sides of the holes or depressions in one ring is substantially constant and substantially equal to that in another ring.

12. The method of claim 7 wherein each generally coaxial ring of holes or depressions has a different perimeter length.

13. The method of claim 7 wherein each generally coaxial ring of holes or depressions has approximately the same perimeter length.

* * * * *